(12) United States Patent
Suzuki et al.

(10) Patent No.: US 7,017,615 B2
(45) Date of Patent: Mar. 28, 2006

(54) PROTECTOR

(75) Inventors: Takashi Suzuki, Mie (JP); Hiroshi Sasaki, Kanagawa (JP)

(73) Assignees: Sumitomo Wiring Systems, Ltd., Mie (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/113,078

(22) Filed: Apr. 25, 2005

(65) Prior Publication Data

US 2005/0241715 A1  Nov. 3, 2005

(30) Foreign Application Priority Data

Apr. 28, 2004  (JP)  ............................ 2004-134453

(51) Int. Cl.
*F16L 9/00* (2006.01)
*H02G 3/04* (2006.01)

(52) U.S. Cl. ...................... 138/110; 138/157; 138/162; 138/166; 174/101; 174/68.3; 52/220.7

(58) Field of Classification Search ................ 138/162, 138/166, 167, 157, 163; 174/101, 97, 68.3; 52/220.7
See application file for complete search history.

(56) References Cited

U.S. PATENT DOCUMENTS

| | | | | |
|---|---|---|---|---|
| 3,003,794 A | * | 10/1961 | Burley | ............... 285/179.1 |
| 3,338,599 A | * | 8/1967 | Hallman | ................ 285/284.1 |
| 4,398,564 A | * | 8/1983 | Young et al. | ............ 138/92 |
| 4,423,284 A | * | 12/1983 | Kaplan | ............... 174/101 |
| 4,891,471 A | * | 1/1990 | Ono et al. | ............. 174/68.3 |
| 4,942,271 A | * | 7/1990 | Corsi et al. | ............ 174/101 |
| 4,951,716 A | * | 8/1990 | Tsunoda et al. | ......... 138/162 |
| 5,024,251 A | * | 6/1991 | Chapman | ............. 138/92 |
| 5,401,905 A | * | 3/1995 | Lesser et al. | .......... 174/99 R |
| 5,709,249 A | * | 1/1998 | Okada et al. | ........... 138/162 |

FOREIGN PATENT DOCUMENTS

| | | |
|---|---|---|
| JP | A 04-134116 | 5/1992 |
| JP | A 04-134117 | 5/1992 |

* cited by examiner

*Primary Examiner*—Patrick Brinson
(74) *Attorney, Agent, or Firm*—Oliff & Berridge, PLC (57) ABSTRACT

A protector includes a main body, lids, hinges, and lock portions. The main body including a bottom wall, a first sidewall, and a second sidewall. The lids are coupled to the main body through the hinges. The lock portions are disposed between the lids and the main body. The lids are configured to cover the main body from both sides thereof. A first lid includes a closure plate at an adjacent position thereof. The closure plate protrudes from an end portion of the first lid toward an inner surface side of the second lid. The closure plate closes gap between the first and second lids. A second lid includes a misassembly prevention rib at an adjacent position thereof. The rib protrudes from an end portion of an outer surface of the second lid toward a direction away from the bottom wall.

6 Claims, 6 Drawing Sheets

PROTECTOR

BACKGROUND OF THE INVENTION

1. Field of the Invention

The present invention relates to a protector which allows a wire harness to be wired in vehicles to pass therethrough to protect the wire harness and restrict the path of the wire harness, and more particularly to improvement in a closing structure of a lid for closing an upper opening of a main body of the protector after the wire harness is inserted through the main body of the protector made of a resin molded product.

2. Description of the Related Art

Figure 6:
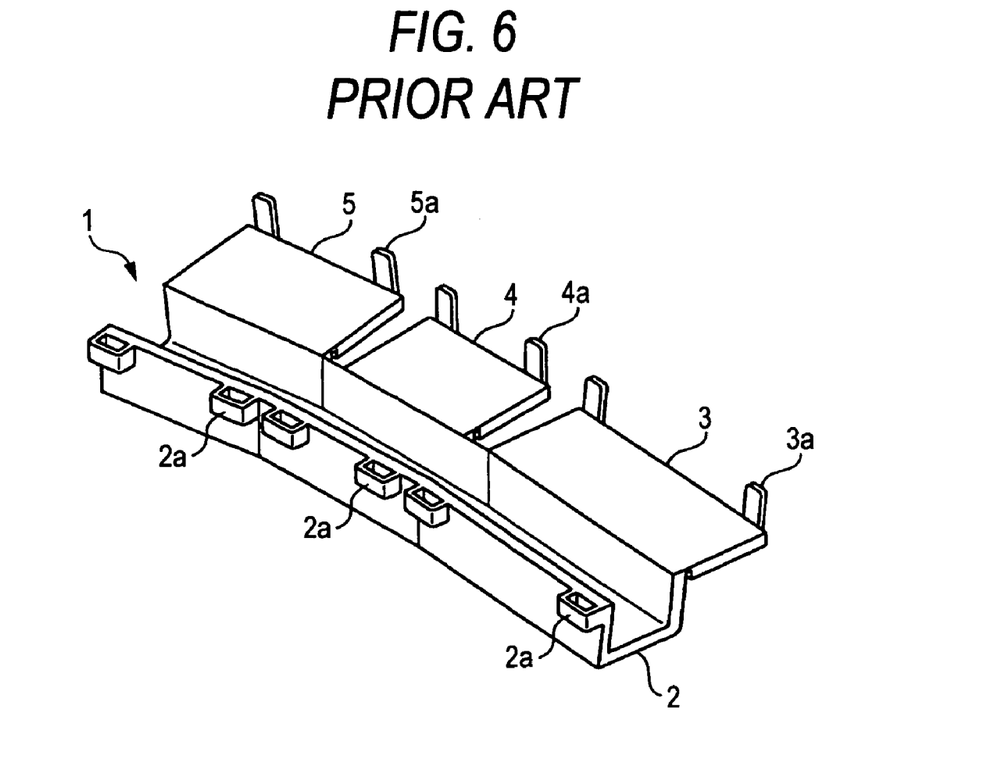
FIG. 6 is a perspective view showing an example according to prior art.

In a trough-shaped protector body, as shown in FIG. 6, in a case where a wire harness to be inserted therethrough needs to be bent, or in a case where a sufficient space into which a lock portion protrudes cannot be secured on the same outer surface, the trough-shaped main body 2 is bent along the longitudinal direction thereof. Plural lids 3 to 5 are coupled through hinges to one side of the main body 2 between which bent portions of the main body 2 are provided. An operator closes the respective lids 3 to 5 in a state where the wire harness is inserted through the main body 2, and locks lock portions 3a to 5a in locked portions 2a to fix them.

However, while the operator performs an operation of closing the plural lids 3 to 5, all the lids 3 to 5 are coupled through the hinges to one side of the main body 2. Therefore, for example, the operator should close the other lids 4 and 5 provided on the same side one after another while the operator closes the lid 3 with his/her right hand, which leads to a poor workability.

Figure 7:
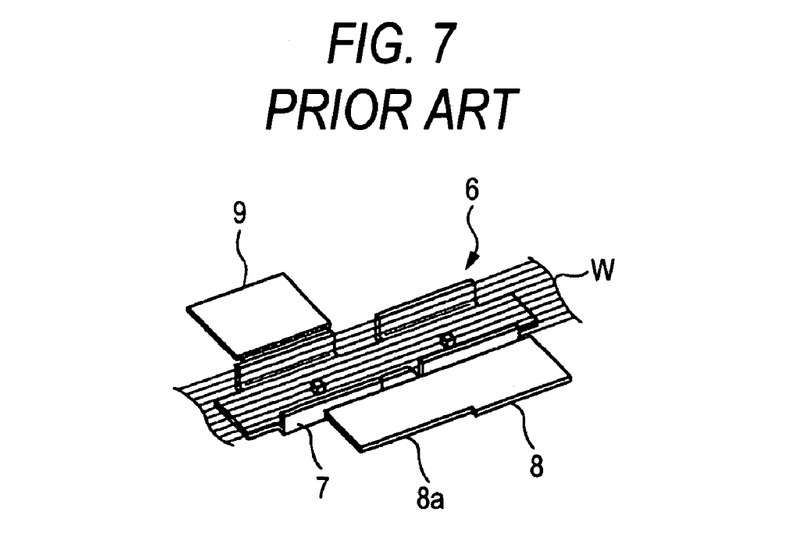
FIG. 7 is a perspective view showing another example according to prior art.

As shown in FIG. 7, a protector 6, which is disclosed in JP-U-Hei.4-134117, is constructed in such a manner that two lids 8 and 9 are provided in a trough-shaped main body 7 to face each other. In other words, for example, the operator closes one lid 8 using his/her right hand and at the same time closes the other lid 9 with his/her left hand, in a state where wire harness W is inserted through the main body 7, which improves the workability.

On the other hand, the lid 9 of the two lids 8 and 9 needs to be closed after the lid 8 having an extension portion 8a is closed. However, even when the operator follows the wrong procedure, the thin extension portion 8a is merely placed on the upper side of the lid 9. As a result, there is a fear that the operator would not be aware of this misassembling.

Figure 8:
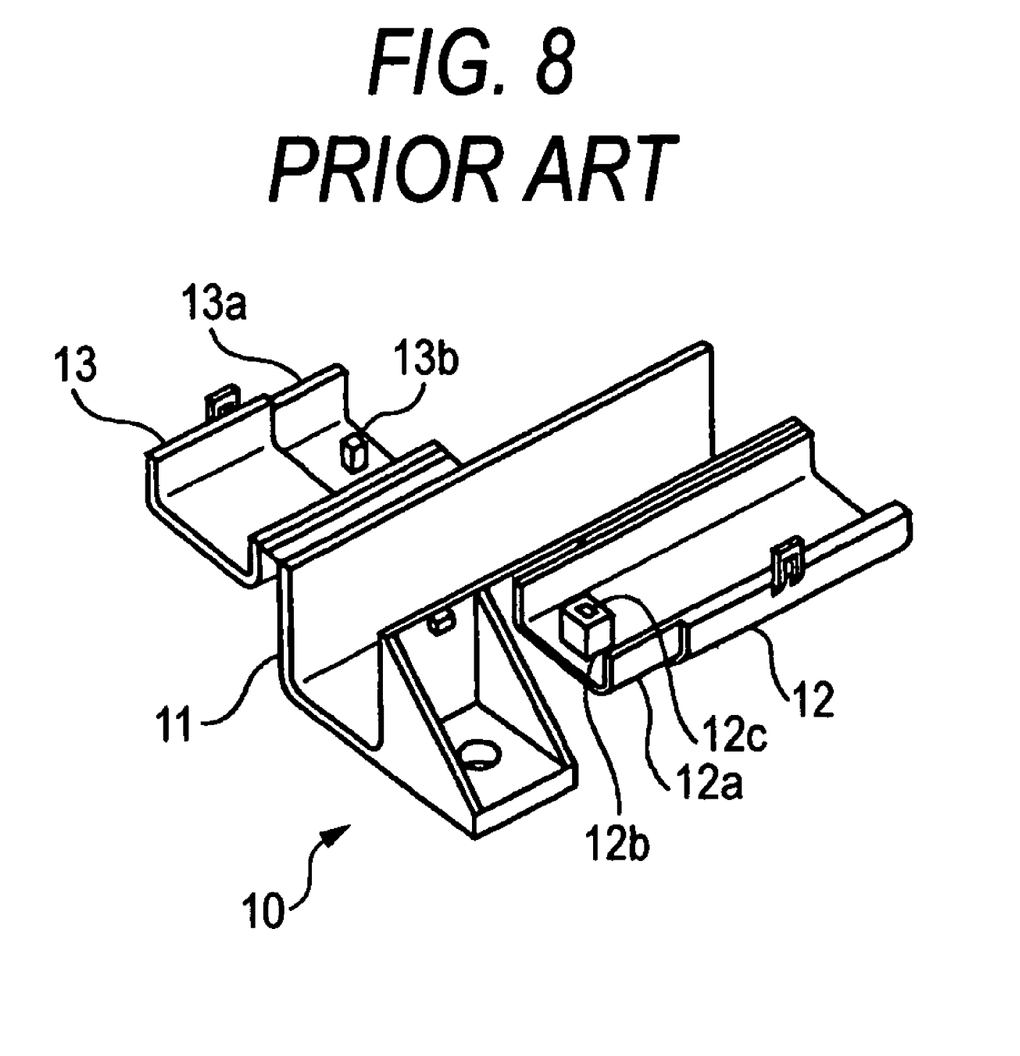
FIG. 8 is a perspective view showing a still another example according to prior art.

Therefore, in a protector 10 disclosed in JP-U-Hei.4-134116, as shown in FIG. 8, an end portion 12a of a lid 12 provided on one side of a trough-shaped main body 11 overlaps an end portion 13a of a lid 13 provided on the other side of the main body 11. A protrusion 12b having a locking hole 12c protrudes therefrom in the inner side of the one end portion 12a. A pin 13b protrudes from the inner side of the other end portion 13a.

In other words, the protector is constructed in such a manner that when the lid 13 is closed after the lid 12 is closed to make lock coupling, the pin 13b of the lid 13 is correctly inserted through and locked in the locking hole 12c of the lid 12. Therefore, if the operator follows the wrong procedure, the protrusion 12b of the lid 12 interferes with the upper side of the lid 13 previously closed and cannot be closed. As a result, the misassembling is recognized.

However, in the case of the protector 8 shown in FIG. 8, because the protrusion 12b and pin 13b protrude toward the inner side of the main body 11 in procedure to recognize the misassembling, the space used for inserting the wire harness through the main body 11 is narrowed. As a result, there arises a problem in that the size of the whole protector 10 increases.

Moreover, because the lid 13 is closed in a state in which it has rotated about a hinge as a fulcrum, the path of the pin 13b at this instance may be inclined with respect to the axis of the locking hole 12c of the cover 12. Thus, the pin 13b is not inserted well into the locking hole 12b of the lid 12 previously closed, which leads to a poor workability.

Moreover, because both the protrusion 12b having the locking hole 12c and the pin 13b are provided in procedure to prevent the misassembling, it is necessary to take into consideration of those dimension and positional relation therebetween at a time of designing the protector, which leads to a complicated design work.

SUMMARY OF THE INVENTION

In view of the above-described problems, the invention provides a protector including divided lids in which the misassembling of the lids can be prevented and the workability is improved.

According to one embodiment of the invention, a protector allows wire harness to pass therethrough. The protector includes a main body, lids, hinges, and lock portions. The main body has a substantially U shape in section. The main body includes a bottom wall, a first sidewall, and a second sidewall. The lids includes a first lid and a second lid. The lids are arranged in an extending direction of the main body. The hinges includes first and second hinges. The lids are coupled to the main body through the hinges, respectively. The first lid is coupled to the first sidewall through the first hinge. The second lid being coupled to the second sidewall through the second hinge. The lock portions are disposed between the lids and the main body, respectively. The lock portions engage with the lids, respectively. The lids are configured to cover the main body from both sides thereof. The first lid includes a closure plate at an adjacent position thereof where the first lid is adjacent to the second lid. The closure plate protrudes from an end portion of the first lid toward an inner surface side of the second lid. The closure plate closes gap between the first lid and the second lid. The second lid includes a misassembly prevention rib at an adjacent position thereof where the second lid is adjacent to the first lid. The rib protrudes from an end portion of an outer surface of the second lid toward a direction away from the bottom wall of the main body. An assembly procedure is set so that the first lid including the closure plate is first closed and then the second lid including the rib is closed. If an operator fails to follow the assembly procedure and misassembles the first and second lids and the main body, the closure plate runs on the rib to prevent the first lid including the closure plate from being engaged with the lock portion.

When the lid of the protector are divided into several pieces of lids, a gap is formed at an adjacent position of the lids and the interior of the protector can be seen through the gap. Therefore, appearance of the protector becomes poor, and further there is a fear that a sharp interference material may be inserted through the gap to damage the wire harness. Thus, in the structure described above, the closure plate closing the interior at an adjacent position of the lids protrudes from the first lid. However, when an operator fails to follow the assembly procedure of closing the lids, the closure plate is located in the outer surface of the second lid and the first lid would be deformed, thereby making it impossible to lock the lids onto the main body.

Therefore, in the structure described above, the misassembly prevention rib from the second lib, which is adjacent to the first lib having the closure plate protruding therefrom. Thereby, in a case where the operator fails to follow the assembly procedure of assembling the lids, the closure plate jumps toward the outer surfaces of the lids by the rib. Thus the operator is able to be aware of the misassembling on the instant. In addition, the misassembly prevention rib protrudes from the outer surface of the second lid, and the rib does not protrude into the space of the main body through which wire harness is inserted. Therefore, it is possible to make the inner space of the main body as small as possible according to the outer diameter of the wire harness. Thus, it is possible to prevent the protector from becoming large in size.

Furthermore, when each lid is closed by following the correct assembly procedure, the end portion of the second lid is simply placed onto the upper side of the closure plate of the first lid. It is possible to eliminate the operation of engaging both lids. Thus, it does not deteriorate the workability, unlike the case disclosed in the prior art shown in FIG. 8. Moreover, because it is only necessary that the misassembly prevention rib is provided on the outer surface of the second lid, it is possible to simplify the design work.

According to one embodiment of the invention, the lids may be separated from each other at a position where the main body changes an angle of the extending direction or a position where it is impossible to provide the lock portions on an outer surface of only one of the first and second sidewalls. The closure plate may protrude from an inner surface of the first lid. When the closure plate is located on an inner side of the second lid, an outer surface of the first lid may be flush with the outer surface of the second lid.

In other words, in a case where the main body changes an angle of the longitudinal direction (extending direction), it is impossible to close the main body beyond its bent portion with only a single lid, and it is necessary to divides the lid into several pieces with the bent portion of the main body interposed therebetween. With this construction, because the closure plate located at a portion where the divided lids overlap each other protrudes from the inner surface of the first lid. Thus, when the second lid overlaps the closed surface, the outer surfaces of the respective lids flush with each other, and it is thus possible to provide an integral appearance.

Furthermore, according to one embodiment of the invention, at least one of the first and second sidewalls may define at an intermediate position thereof, an opening through which a branch line branched from a main line of the wire harness is drawn out. The opening divides the at least one of the first and second sidewalls into two sub sidewalls. A lid coupled through a hinge to one of the sub sidewalls on branch upstream may be set to be first closed.

In this way, when the lid at a branching position is closed first, it is possible to position a branching position of the wire harness in the protector while the main body and lids sandwich the wire harness therebetween, thereby to enhance the preciseness in the dimension of the branch lines that are drawn out from the protector.

According to one embodiment of the invention, numbers may be engraved in the lids. The numbers indicate the assembly procedure. With this structure, even if the operator does not memorize the correct closing order, when the operator is involved in the assembly operation of the protector, he/she can see the closing order on the spot. It is thus possible to prevent possible misassembly in advance, thereby enhancing the workability.

As can be clear from the above description, in the protector according to the embodiments of the invention in which the lid, which closes top opening of the main body of the protector is divided into several pieces and the divided lids are locked after the wire harness has been inserted through the main body, the closure plate is formed in one of the lids to close the gap formed between the divided lids; and in a case where the lid is not closed in such a procedure that the closure plate is placed onto the inner side of the adjacent lid, the closure plate jumps on the outer surface of the lid. Thus, the operator is able to be aware of the misassembly immediately and rearrange the closing order of the lids.

DETAILED DESCRIPTION OF THE PREFERRED EMBODIMENTS

Hereafter, preferred embodiments of the invention will be described with reference to the accompanied drawings.

Figure 1:
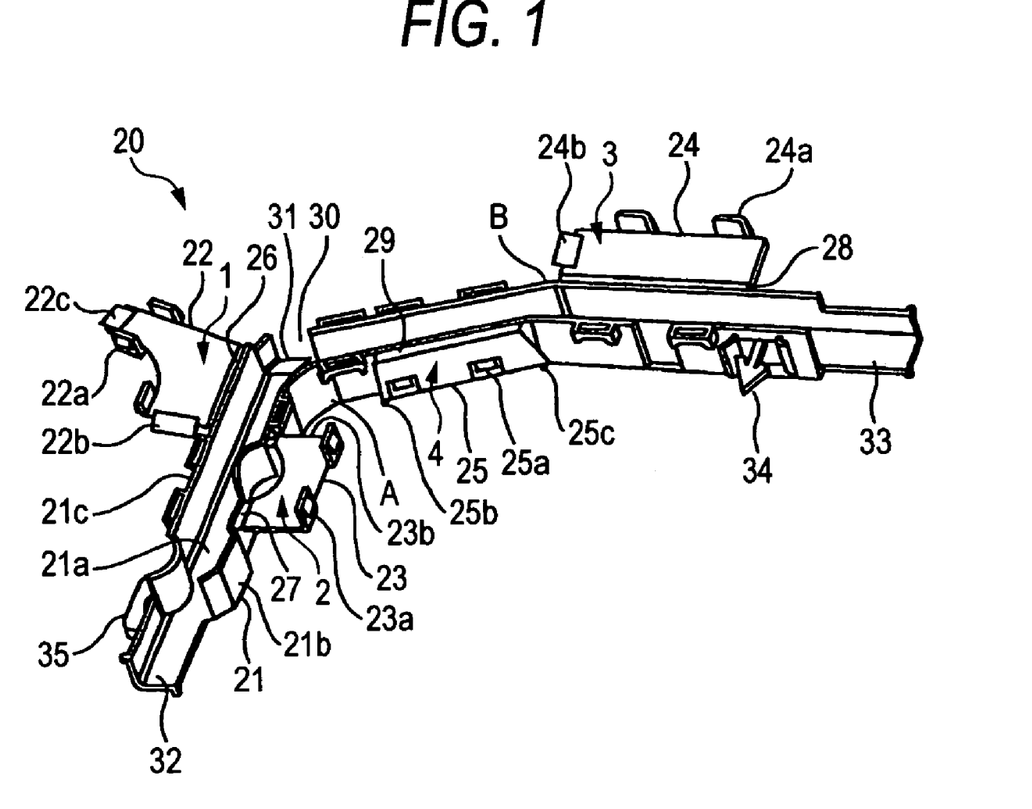
FIG. 1 is a schematic view of a protector according to an embodiment of the invention.

A protector 20 is formed by integral molding with using a synthetic resin. The protector 20 includes a trough-shaped main body 21, and first to fourth lids 22 to 25. The main body 21 has a substantially U shape in section. The main body 21 has a bottom wall 21a and both sidewalls 21b and 21c. The first and third lids 22 and 24 are connected to one sidewall 21c through thin hinges 26 and 28, respectively. The second and fourth lids 23 and 25 are connected to the other sidewall 21b through thin hinges 27 and 29, respectively. The second lid 23, the first lid 22, the fourth lid 25 and the third lid 24 are disposed in this order from the upstream side to alternately face one another.

Frame-shaped locked portions 21d and 21e are provided at predetermined positions of both the sidewalls 21b and 21c. Lock portions 22a to 25a serving as locking claws protrude from corresponding positions of end portions of the first to fourth lids 22 to 25.

The main body 21 is shaped to have bent portions A and B where the main body changes an angle of its longitudinal direction (extending direction). The main body 21 has tape-winding tongue pieces 32 and 33, which extends from upstream and downstream end portions in the longitudinal direction. The main body 21 also defines a recessed portion 21f, which is recessed toward inner side of the other sidewall 21b having the second lid 23 connected thereto.

In other words, because the first and fourth lids 22 and 25 and the third and fourth lids 24 and 25 have therebetween the bent portions A and B where the angle of the main body 21 changes. Therefore, the first and fourth lids 22 and 25 and the third and fourth lids 24 and 25 are separated from each other. Moreover, the first lid 22 and the second lid 23 define a recessed portion 21g, which is recessed in an arc shape and the other sidewall 21b cannot be provided with the locked portion 21e. Therefore, the first lid 22 and the second lid 23 are separated from each other.

Moreover, a clamp 34 for engaging with a vehicle body panel protrudes from a predetermined position of an external surface of the other sidewall 21b. A bracket 35 defining bolt hole is provided at a predetermined position of the one sidewall 21c.

Moreover, a drawing-out opening 30 for drawing out branch line W2, which branches from the main lines W1 of wire harness W/H, is defined at an intermediate position of the one sidewall 21c. A tape-winding tongue piece 31 protrudes from an end edge of the drawing-out opening 30. A lid located at upstream side in a direction where the wire harness is inserted through the drawing-out opening 30 used for drawing out branch lines is designated as the first lid 22, and the first lid 22 is closed first in the closing procedure.

A number that indicates the closing order is engraved on the inner sides of the first to fourth lids 22 to 25. Specifically, number "1" is marked on the inner side of the first lid 22, number "2" is marked on the inner side of the second lid 23, number "3" is marked on the inner side of the third lid 24, and number "4" is marked on the inner side of the fourth lid 25, respectively.

In other words, the first lid 22 and the second lid 23, which are located branch upstream of the drawing-out opening 30, are closed prior to the third lid 24 and the fourth lid 25, which are located branch downstream. Further, the first lid 22 and the second lid 23 have a relationship that the first lid 22 located nearer to the drawing-out opening 30 than the second lid 23 is closed first in the closing procedure to position the branch line W2 to the drawing-out opening 30 easily. Moreover, the third lid 24 and the fourth lid 25 have a relationship that the third lid 24 located nearer to the tape winding tongue piece 33 than the fourth lid 25 is closed first in the closing procedure to position the main lines W2 to the tape winding tongue piece 33 easily.

Thin closure plates 22b and 22c are provided at both end portions of the first lid 22 in the longitudinal direction, that is, adjacent positions where the first lid is adjacent to the second and fourth lids 23 and 25. The closure plates 22b and 22c extend from a lower end surface (inner surface) of the first lid 22 to positions where the closure plates 22b and 22c overlap the second lid 23 and the fourth lid 25.

A misassembly prevention rib 23b is provided at an end portion of the second lid 23 in the longitudinal direction, that is, an adjacent position where the second lid is adjacent to the first lid 22. The misassembly prevention rib 23b protrudes from the outer surface of the second lid 23 in a direction away from the bottom wall of the main body 21 by substantially 1 mm to 3 mm in height.

A thin closure plate 24b is provided at an end portion of the third lid 24 in the longitudinal direction, that is, an adjacent position where the third lid 24 is adjacent to the fourth lid 25. The thin closure plate 24b extends from a lower end surface (inner surface) of the third lid 24 to a position where the plate 24b overlaps the fourth lid 25.

Misassembly prevention ribs 25b and 25c are provided at both end portions of the fourth lid 25 in the longitudinal direction, that is, adjacent positions where the fourth lid 25 is adjacent to the first lid 22 and the third lid 24. The misassembly prevention ribs 25b and 25c protrude from the outer surface of the fourth lid 25 in the direction away from the bottom wall of the main body 21 by substantially 1 mm to 3 mm in height.

Next, the procedure of assembling the protector 20 to the wire harness W/H will be described.

Figure 2:
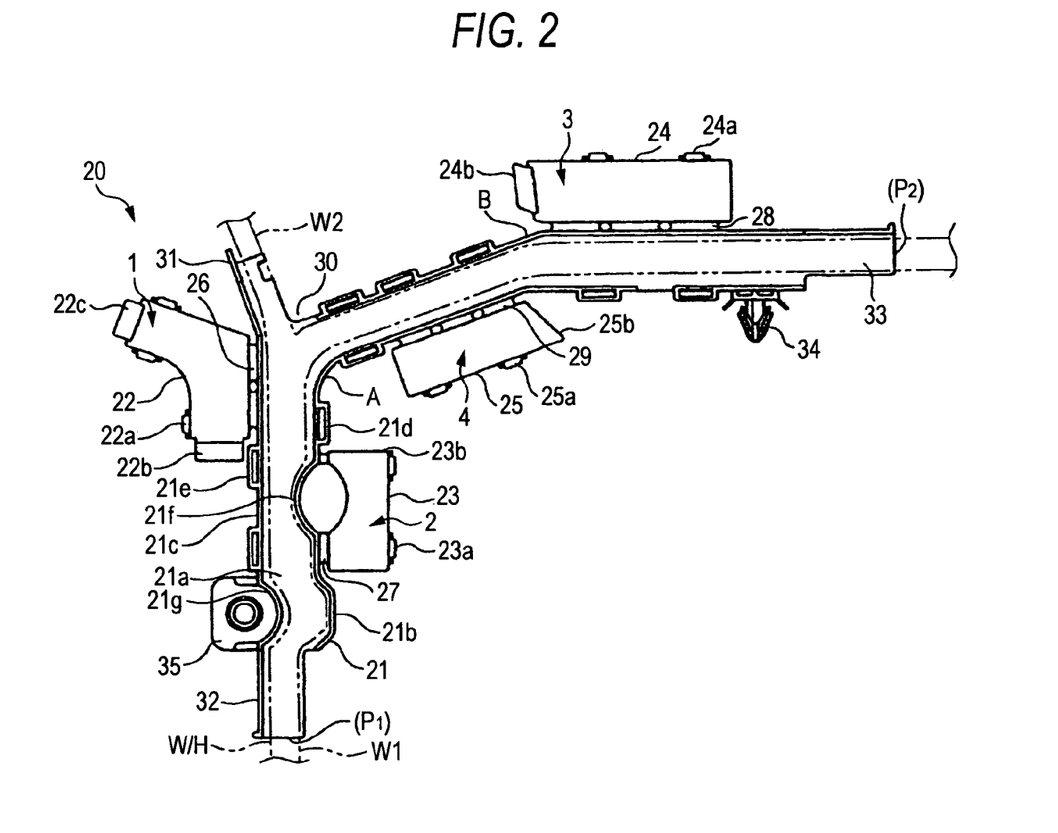
FIG. 2 is a plan view of the protector.

First, as shown in FIG. 2, the main lines W1 of the wire harness W/H is inserted through the inner space of the main body 21 ranging from an entrance point P1 of the protector 20 to an exit point P2 of the protector 20, and the branch line W2, which branches from the main lines W1, is led out of the drawing-out opening 30 to the outside.

In this state, in accordance with the order of the numbers "1" to "4" engraved on the inner surface of the respective covers 22 to 25, the operator closes the first lid 22 with his/her left hand and closes the second lid 23 with his/her right hand, thereby engaging/locking the lock portions 22a and 23b with the locked portions 21d and 21e, respectively. Thereafter, the operator closes the third lid 24 with his/her left hand and closes the fourth lid 25 with his/her right hand, thereby engaging/locking the lock portions 24a and 25b with the locked part 21d and 21e, respectively.

Figure 3:
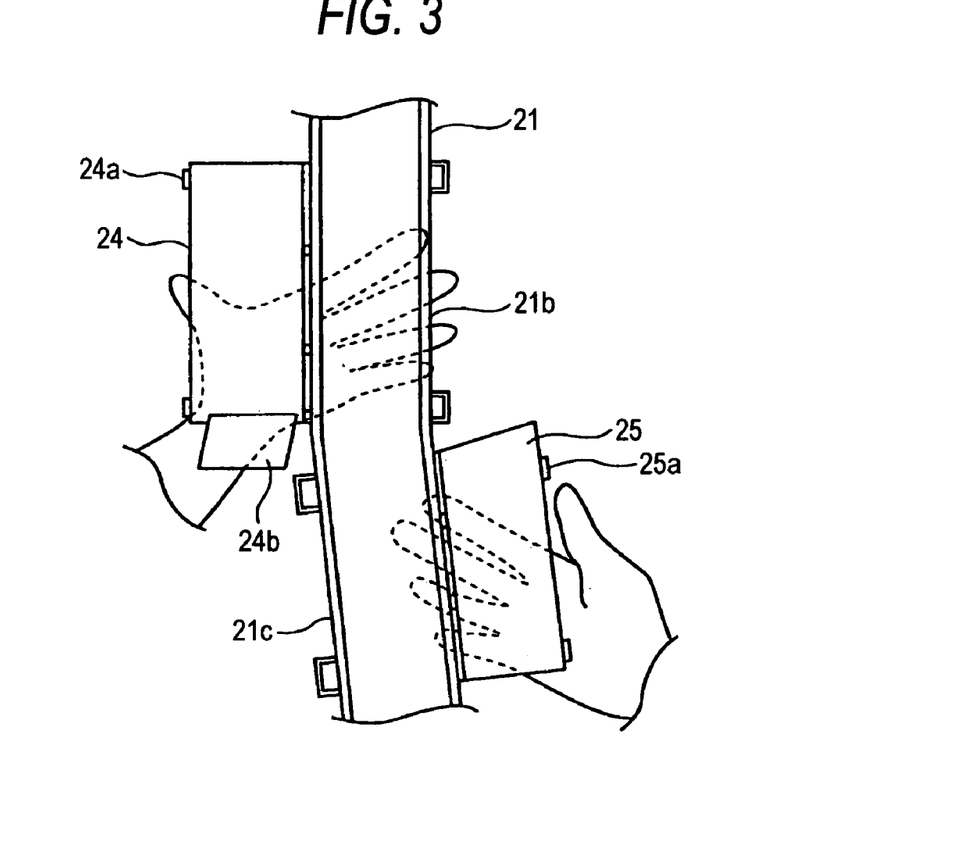
FIG. 3 is an explanatory view showing an assembly procedure.

In other words, as illustrated in FIG. 3 using the third lid 24 and the fourth lid 25, the operator is able to closes the two covers 24 and 25 from both sides with his/her both hands. Thus, it is possible to decrease the number of work processes.

Figure 4:
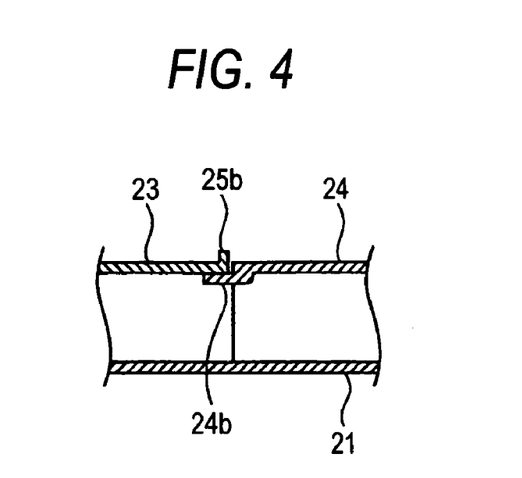
FIG. 4 is a sectional view of main parts, illustrating correct assembling.

Moreover, as shown in FIG. 4, if the operator follows the correct closing procedure that the fourth lid 25 is closed after the third lid 24 has been closed, even in a state in which the closure plate 24b is located on the inner surface of the fourth lid 25, a gap is not generated between the third lid 24 and the fourth lid 25, and the outer surfaces of the respective lids 24 and 25 are flush with each other. As a result, a good appearance can be maintained.

Figure 5A:
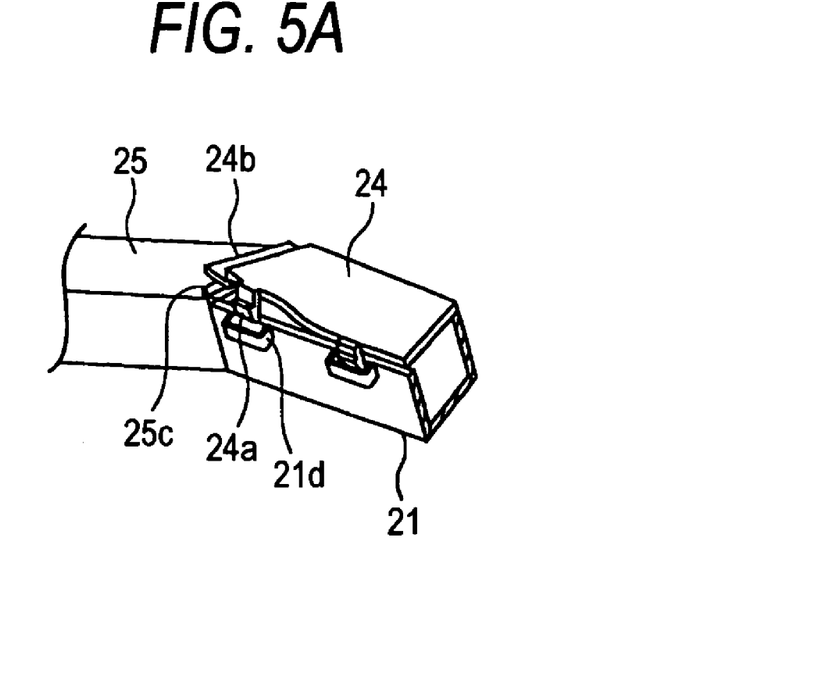
FIG. 5A is a perspective view of main parts, illustrating misassembling.
Figure 5B:
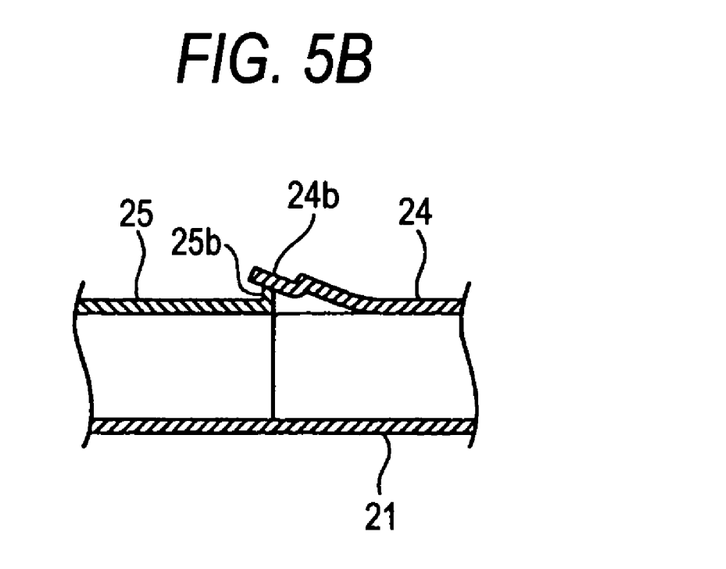
FIG. 5B is a sectional view of main parts.

On the other hand, if the operator fails to follow the correct closing procedure and misassembles the lids, as shown in FIGS. 5A and 5B using the third lid 24 and the fourth lid 25, the closure plate 24b runs on the rib 25b, and the third lid 24 having the closure plate 24b protruding therefrom cannot be locked with the main body 21. Thus, the operator is able to be aware of the misassembling with ease.

As described above, according to the protector according to the embodiments of the invention, since a closure plate is located at the gap between the divided lids so that the interior of the protector cannot be seen, the appearance of the protector can be improved. In addition, in a case where the lids are not closed in such a correct closing procedure, which makes the closure plates locate on the inner side of the adjacent lid, the closure plate jumps on the outer surface of the lid. As a result, since the operator is able to be aware of the misassembling immediately, the workability of closing the lids can be improved.

What is claimed is:

1. A protector, which allows wire harness to pass therethrough, the protector comprising:
 a main body having a substantially U shape in section, the main body including a bottom wall, a first sidewall, and a second sidewall;
 lids including a first lid and a second lid, the lids arranged in an extending direction of the main body;
 hinges including first and second hinges, the lids being coupled to the main body through the hinges, respectively, the first lid being coupled to the first sidewall through the first hinge, the second lid being coupled to the second sidewall through the second hinge; and
 lock portions disposed between the lids and the main body, respectively, the lock portions engaging with the lids, respectively, wherein:
 the lids are configured to cover the main body from both sides thereof;

the first lid includes a closure plate at an adjacent position thereof where the first lid is adjacent to the second lid, the closure plate protruding from an end portion of the first lid toward an inner surface side of the second lid, the closure plate closing gap between the first lid and the second lid;

the second lid includes a misassembly prevention rib at an adjacent position thereof where the second lid is adjacent to the first lid, the rib protruding from an end portion of an outer surface of the second lid toward a direction away from the bottom wall of the main body;

an assembly procedure is set so that the first lid including the closure plate is first closed and then the second lid including the rib is closed; and if an operator fails to follow the assembly procedure and misassembles the first and second lids and the main body, the closure plate runs on the rib to prevent the first lid including the closure plate from being engaged with the lock portion.

2. The protector according to claim 1, wherein:

the lids are separated from each other at a position where the main body changes an angle of the extending direction or a position where it is impossible to provide the lock portions on an outer surface of only one of the first and second sidewalls;

the closure plate protrudes from an inner surface of the first lid; and when the closure plate is located on an inner side of the second lid, an outer surface of the first lid is flush with the outer surface of the second lid.

3. The protector according to claim 1, wherein:

at least one of the first and second sidewalls defines at an intermediate position thereof, an opening through which a branch line branched from a main line of the wire harness is drawn out;

the opening divides the at least one of the first and second sidewalls into two sub sidewalls; and a lid coupled through a hinge to one of the sub sidewalls on branch upstream is set to be first closed.

4. The protector according to claim 2, wherein:

at least one of the first and second sidewalls defines at an intermediate position thereof, an opening through which a branch line branched from a main line of the wire harness is drawn out;

the opening divides the at least one of the first and second sidewalls into two sub sidewalls; and a lid coupled through a hinge to one of the sub sidewalls on branch upstream is set to be first closed.

5. The protector according to claim 1, wherein numbers are engraved in the lids, the numbers indicate the assembly procedure.

6. The protector according to claim 2, wherein numbers are engraved in the lids, the numbers indicate the assembly procedure.

* * * * *